United States Patent
Uchida et al.

(10) Patent No.: US 11,308,464 B2
(45) Date of Patent: Apr. 19, 2022

(54) RECORDING MEDIUM RECORDED WITH INFORMATION PROCESSING PROGRAM, INFORMATION PROCESSING METHOD, AND INFORMATION PROCESSING APPARATUS

(71) Applicant: Mercari, Inc., Tokyo (JP)

(72) Inventors: Kan Uchida, Tokyo (JP); Kazuki Takahashi, Tokyo (JP)

(73) Assignee: Mercari, Inc., Tokyo (JP)

( * ) Notice: Subject to any disclaimer, the term of this patent is extended or adjusted under 35 U.S.C. 154(b) by 0 days.

(21) Appl. No.: 16/841,768

(22) Filed: Apr. 7, 2020

(65) Prior Publication Data

US 2020/0327512 A1 Oct. 15, 2020

(30) Foreign Application Priority Data

Apr. 15, 2019 (JP) .............................. JP2019-077127

(51) Int. Cl.
*G06Q 20/10* (2012.01)
*G06Q 20/40* (2012.01)

(52) U.S. Cl.
CPC ......... *G06Q 20/10* (2013.01); *G06Q 20/4014* (2013.01)

(58) Field of Classification Search
None
See application file for complete search history.

(56) References Cited

U.S. PATENT DOCUMENTS

| | | | |
|---|---|---|---|
| 8,255,323 B1* | 8/2012 | Casey | G06Q 20/42 705/39 |
| 11,010,049 B2* | 5/2021 | Van Damme | G06F 3/0486 |
| 2014/0025513 A1* | 1/2014 | Cooke | G06Q 20/20 705/17 |
| 2016/0117651 A1* | 4/2016 | Davis | G06Q 20/386 705/40 |
| 2016/0224966 A1* | 8/2016 | Van Os | G06Q 20/3224 |
| 2017/0061420 A1* | 3/2017 | Serrano | G06F 3/04847 |
| 2018/0096319 A1* | 4/2018 | Aggarwal | G06Q 20/403 |
| 2018/0336543 A1* | 11/2018 | Van Os | G06Q 20/102 |
| 2019/0043306 A1* | 2/2019 | Higgins | G06Q 20/367 |
| 2019/0080303 A1* | 3/2019 | Nair | G06Q 20/12 |
| 2020/0090147 A1* | 3/2020 | Cole | G06Q 20/108 |
| 2020/0111103 A1* | 4/2020 | Kalaboukis | G06Q 20/3224 |

FOREIGN PATENT DOCUMENTS

JP 2010-108177 A 5/2010

* cited by examiner

*Primary Examiner* — Kirsten S Apple
*Assistant Examiner* — Matthew Cobb
(74) *Attorney, Agent, or Firm* — Sterne, Kessler, Goldstein & Fox P.L.L.C.

(57) ABSTRACT

A non-transitory computer-readable recording medium recorded with an information processing program executable by a processor of an information processing apparatus, the information processing program causing the processor to perform operations including configuring an operation area on a display unit of the information processing apparatus, the operation area being associated with a payment target candidate user, determining a payment amount, based on an extent of an action in a user operation performed in the operation area, and transmitting information about a payment of the payment amount with respect to the payment target candidate user.

20 Claims, 11 Drawing Sheets

RECORDING MEDIUM RECORDED WITH INFORMATION PROCESSING PROGRAM, INFORMATION PROCESSING METHOD, AND INFORMATION PROCESSING APPARATUS

CROSS-REFERENCE TO RELATED APPLICATION

The present application is based on and claims priority under 35 U.S.C. § 119 to Japanese Patent Application No. 2019-077127, filed on Apr. 15, 2019, the content of which is incorporated herein by reference in its entirety.

BACKGROUND OF THE INVENTION

1. Field of the Invention

The present disclosure relates to a recording medium recorded with an information processing program, an information processing method, and an information processing apparatus.

2. Description of the Related Art

A technique for transferring money between individuals or between an individual and a company by using portable terminals is known as disclosed in, for example, Japanese Unexamined Patent Application Publication No. 2010-108177.

SUMMARY OF THE INVENTION

However, it may be troublesome for a user to execute money transfer processing, which includes many steps, such as transitioning between many screens and inputting a money transfer amount, to be performed by the user.

It is an object of the present disclosure to provide a technique that enables money transfer to be performed more intuitively and more easily in money transfer processing using a portable terminal.

According to an embodiment of the present disclosure information, a non-transitory computer-readable recording medium is recorded with an information processing program executable by a processor of an information processing apparatus, and the information processing program causes the processor to perform operations including configuring an operation area on a display unit of the information processing apparatus, the operation area being associated with a payment target candidate user, determining a payment amount, based on an extent of an action in a user operation performed in the operation area, and transmitting information about a payment of the payment amount with respect to the payment target candidate user.

DESCRIPTION OF THE EMBODIMENT

<Legal Compliance>

The disclosure set forth in this specification will be performed, if implemented, in compliance with the laws and regulations in each country in which the technique of the present disclosure is implemented. In addition, the disclosure set forth in this specification is implemented upon applying all changes, substitutions, variations, alterations, and modifications that can be made by those skilled in the art that are needed to comply with the laws and regulations in the country.

An aspect for implementing a technique for achieving easier and more intuitive money transfer processing using a portable terminal according to the present disclosure will be hereinafter described with reference to the drawings.

<System Configuration>

Figure 1:
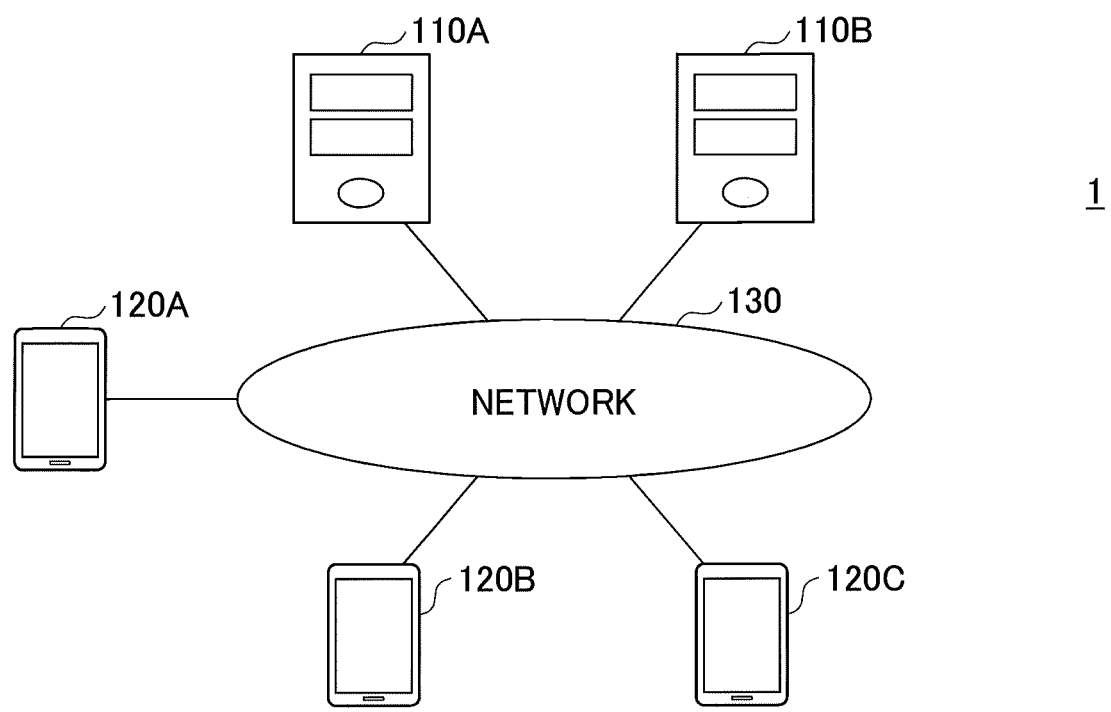
FIG. 1 is a drawing illustrating a configuration of a communication system according to an embodiment of the present disclosure.

FIG. 1 is a drawing illustrating a configuration of a communication system 1 according to an embodiment of the present disclosure. As disclosed in FIG. 1, a server 110A, a server 110B, a terminal 120A, a terminal 120B, and a terminal 120C are connected via a network 130 in a communication system 1.

In the present disclosure, in a case where it is not necessary to distinguish the server 110A and the server 110B from each other, each of the server 110A and the server 110B may be referred to as a server 110.

In the present disclosure, in a case where it is not necessary to distinguish the terminal 120A, the terminal 120B, and the terminal 120C from each other, each of the terminal 120A, the terminal 120B, and the terminal 120C may be referred to as a terminal 120.

In the present disclosure, in a case where it is not necessary to distinguish the server 110 and the terminal 120 from each other, each of the server 110 and the terminal 120 may be referred to as an information processing apparatus 200. The number of information processing apparatuses 200 connected to the network 130 is not limited to the number illustrated in the example of FIG. 1.

The server 110 provides a predetermined service to the terminal 120 used by a user via the network 130. The predetermined service includes, but is not limited to, payment services, financial services, e-commerce services, social networking services (SNS) such as instant messaging services using instant messengers and the like, and content providing services providing music, videos, books, and the like. By allowing a user to use the predetermined service with the terminal 120, the server 110 can provide the predetermined service to one or more terminals 120.

The terminal 120 is a terminal such as a smartphone of a user, and performs a payment service and the like provided by the server 110.

In the present disclosure, the payment service is a service that allows one or more users to transfer money or money equivalents. The payment service includes, but is not limited to, services performing payment by using a one-dimensional code (e.g., a bar code and the like), a two-dimensional code (e.g., a QR code (registered trademark) and the like) (hereinafter, one-dimensional codes and two-dimensional codes are collectively referred to as "two-dimensional codes and the like"), or short-distance communication (e.g., NFC (Near Field Communication), BLE (Bluetooth (registered trademark) Low Energy), Wi-Fi (registered trademark), ultrasonic communications, infrared communications, and the like). A type of payment in which a terminal 120 of a user (payer) who pays the payment scans a two-dimensional code and the like to make the payment is referred to as "user-reading type code payment" or "MPM (Merchant Presented Mode)". A type of payment in which a first terminal 120 of a user who pays the payment displays a two-dimensional code and the like and a second terminal 120 of a store-side user (e.g., seller or demandant) who demands the payment reads the displayed two-dimensional code and the like to receive the payment will be referred to as "store-reading type code payment" or "CPM (Consumer Presented Mode)". It should be noted that MPM and CPM may be dynamic or stationary.

As necessary, a terminal used by a user X will be referred to as a terminal 120X, and user information in a predetermined service associated with the user X or the terminal 120X will be referred to as user information X. It should be noted that the user information is information about a user associated with an account used by the user in the predetermined service. The user information includes, but is not limited to, information associated with the user such as, e.g., a name of the user, an icon image of the user, an age of the user, a gender of the user, an address of the user, hobbies and/or interests of the user, an identifier of the user, and the like, which are input by the user or given by the predetermined service; balance information about an electronic value (e.g., electronic money) associated with the user; and credit card information (e.g., a credit card number and the like) associated with the user, or may be any one of the above or a combination of the above.

The network 130 is configured to connect two or more information processing apparatuses 200. The network 130 refers to a communication network that provides a connection path allowing data to be transmitted and received after the terminal 120 connects to the server 110.

One or more portions of the network 130 may be a wired network or a wireless network. The network 130 includes, but is not limited to, Ad Hoc network, intranet, extranet, virtual private network (VPN), local area network (LAN), wireless LAN (WLAN), wide area network (WAN), wireless WAN (WWAN), metropolitan area network (MAN), a part of the Internet, a part of public switched telephone network (PSTN), cellular phone network, ISDNs (Integrated Service Digital Networks), wireless LAN, LTE (Long Term Evolution), CDMA (Code Division Multiple Access), Bluetooth (registered trademark), satellite communication, and the like, or a combination of two or more of the above. The network 130 may include one or more networks 130.

The information processing apparatus 200 may be any information processing apparatus as long as it is an information processing apparatus that can achieve functions and methods described in the present disclosure.

The information processing apparatus 200 includes, but is not limited to, a smartphone, a mobile phone (e.g., a feature phone), a computer (including, but not limited to, a desktop computer, a laptop computer, a tablet, and the like), a server apparatus, a media computer platform (including, but not limited to, a cable or satellite set-top box, a digital video recorder, and the like), a handheld computer device (including, but not limited to, a PDA (Personal Digital Assistant), an e-mail client, and the like), a wearable terminal (including, but not limited to, a glasses-type device, a clock-type device, and the like)), other types of computers, communication platforms, or the like.

<Hardware Configuration>

Figure 2:
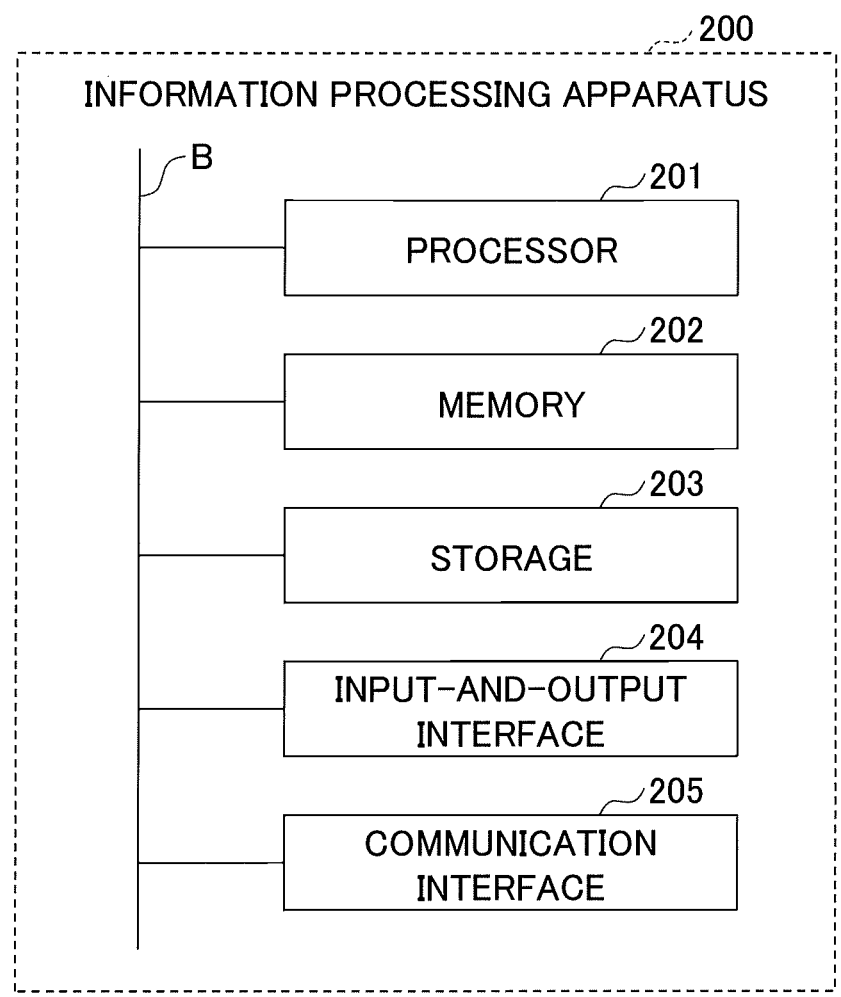
FIG. 2 is a drawing illustrating an example of a hardware configuration of a server and a terminal according to an embodiment.

A hardware configuration of an information processing apparatus 200 included in a communication system 1 will be explained with reference to FIG. 2. FIG. 2 is a drawing illustrating an example of a hardware configuration of an information processing apparatus 200 according to an embodiment.

The information processing apparatus 200 includes a processor 201, a memory 202, a storage 203, an input-and-output interface 204, and a communication interface 205. Constituent elements of hardware of the information processing apparatus 200 are connected by, for example, a bus B, but are not limited thereto.

The information processing apparatus 200 achieves at least one of functions and methods described in the present disclosure by performing operations in cooperation with the processor 201, the memory 202, the storage 203, the input-and-output interface 204, and the communication interface 205.

The processor 201 executes functions and methods implemented by codes or instructions included in a program stored in the storage 203. The processor 201 includes, but is not limited to, a central processing unit (CPU), an MPU (Micro Processing Unit), GPU (Graphics Processing Unit), a microprocessor, a processor core, a multiprocessor, an ASIC (Application-Specific Integrated Circuit), an FPGA (Field Programmable Gate Array), and the like, and each processing disclosed in each embodiment may be implemented by a logic circuit (hardware) or a dedicated circuit formed in an integrated circuit (e.g., an IC (Integrated Circuit) chip and an LSI (Large Scale Integration)) or the like. In addition, these circuits may be implemented by one or a plurality of integrated circuits, and a plurality of sets of processing described in each embodiment may be implemented by a single integrated circuit. LSIs are sometimes referred to as VLSI, super LSI, ultra LSI, and the like, depending on the degree of integration.

The memory 202 temporarily stores a program loaded from the storage 203 and provides the processor 201 with a work area. The memory 202 also temporarily stores various data generated while the processor 201 is executing the program. The memory 202 includes, but is not limited to, a RAM (Random Access Memory), a ROM (Read Only Memory), and the like.

The storage 203 stores programs. The storage 203 includes, but is not limited to, an HDD (Hard Disk Drive), an SSD (Solid State Drive), a flash memory, and the like.

The communication interface 205 transmits and receives various data via the network 130. The communication may be performed via a wire or wirelessly, and any communication protocol may be used as long as mutual communication can be performed. The communication interface 205 has a function of executing communication with another information processing apparatus via the network 130. The communication interface 205 transmits various data to another information processing apparatus according to the instructions from the processor 201. Further, the communication interface 205 receives various data transmitted from another information processing apparatus and transmits the data to the processor 201.

The input-and-output interface 204 includes an input device that inputs various operations to the information processing apparatus 200, and an output device that outputs a processing result processed by the information processing apparatus 200. In the input-and-output interface 204, the input device and the output device may be integrated, or the input device and the output device may be separated.

The input device is implemented by one of or a combination of all kinds of apparatuses capable of receiving an input from a user and transmitting information about the input to the processor 201. The input device includes, but is not limited to, a touch panel, a touch display, hardware keys such as a keyboard, a pointing device such as a mouse, a camera (i.e., an operation input by an image), and a microphone (i.e., an operation input by voice).

The output device is implemented by one of or a combination of all kinds of apparatuses capable of outputting a processing result processed by the processor 201. In a case where the processing result is output as a video or a motion picture, the output device is implemented by one of or a combination of all kinds of apparatuses capable of displaying a display image in accordance with the display data written to the frame buffer. The output device includes, but is not limited to, a touch panel, a touch display, a monitor (including, but not limited to, a liquid crystal display, an OELD (Organic Electroluminescence Display), and the like), a head mounted display (HMD), an apparatus capable of displaying an image, text information, and the like by a projection mapping, a hologram, or in the air (alternatively, in vacuum), a speaker (i.e., audio output), a printer, and the like. It should be noted that the output device may be capable of displaying display data in 3D.

A program of each embodiment of the present disclosure may be provided in such a state that the program is stored in a computer-readable storage medium. The storage medium can store the program as a "non-transitory tangible medium". The program includes, but is not limited to, a software program and a computer program.

The recording medium includes, where appropriate, one or more semiconductor-based or other integrated circuits (ICs) (including, but not limited to, a field programmable gate array (FPGA), an application specific IC (ASIC), and the like), a hard disk drive (HDD), a hybrid hard drive (HHD), an optical disk, an optical disk drive (ODD), a magneto-optical disk, a magneto-optical drive, a floppy diskette, a floppy disk drive (FDD), a magnetic tape, a solid state drive (SSD), a RAM drive, a secure digital card or drive, and any other suitable storage media, or an appropriate combination of two or more of the above. The storage medium may be either a volatile or non-volatile medium, or may be a combination of volatile and non-volatile media, where appropriate.

The program of the present disclosure may be provided to the information processing apparatus 200 via any transmission medium (e.g., a communication network, a broadcast wave, or the like) capable of transmitting the program.

Each embodiment of the present disclosure can also be implemented in the form of a data signal embedded in a carrier wave, in which the program is embodied by electronic transmission.

Programs of the present disclosure are implemented by using script languages such as JavaScript (registered trademark) and Python, C language, Go language, Swift, Kotlin, Java (registered trademark), and the like, but are not limited thereto.

At least a part of the processing in the information processing apparatus 200 may be implemented by cloud computing constituted by one or more computers.

At least a part of the processing performed by the information processing apparatus 200 may be performed by another information processing apparatus. In this case, at least a part of the processing of each functional unit implemented by the processor 201 may be configured to be performed by another information processing apparatus.

<Other>

Unless explicitly stated, a determination in the embodiment of the present disclosure may not be performed. That is, instead of making a determination, a predetermined processing may be performed when a determination condition is satisfied, or a predetermined processing may be performed when a determination condition is not satisfied.

In the present disclosure, unless otherwise specified, or unless otherwise implied in context, "at least one of A and B" means "A, B, or both of A and B". Further, unless otherwise specified, or unless otherwise implied in context, "a", "an", or "the" is considered to mean "one or more". Therefore, in this specification, unless otherwise specified in particular, or unless otherwise implied in context, "an A" or "the A" means "one or more As".

The present disclosure includes any and all changes, substitutions, variations, alterations, or modifications of the embodiment which can be applied by a person skilled in the art to the embodiment and examples of the present disclosure. The appended claims include any and all changes, substitutions, variations, alterations, or modifications which can be applied by a person skilled in the art to the embodiment and examples of the present disclosure. The present disclosure includes any combination of one or more features of the embodiment and examples of the present disclosure and one or more features of another embodiment and examples of the present disclosure, which can be made by a person skilled in the art.

In addition, reference to the appended claims as to an apparatus or a system or constituent elements of the apparatus or the system adapted to, arranged to, having capability to, configured to, available to, operable to, or capable of operating to implement a particular function includes the apparatus, the system, or the constituent elements, regardless of whether the function of the apparatus, the system, or the constituent elements is activated, turned on, or unlocked, as long as the apparatus, the system, or the constituent elements are adapted to, arranged to, having capability to, configured to, available to, operable to, or capable of operating in such a manner.

Unless otherwise explicitly stated, in implementing any one of the embodiments or the examples, the present disclosure may obtain agreement from a user in advance or immediately before execution. The agreement to be obtained may be a comprehensive agreement or may be an agreement obtained on each occasion.

Embodiment

The embodiment of the present disclosure is an embodiment for determining a payment amount with respect to a payment target candidate user on the basis of an operation intensity (an extent of an action) of a user operation such as swipe operation performed in an operation area associated with a payment target candidate user. It should be noted that in the present embodiment, the "payment" includes a money transfer from a user who performs the user operation to the payment target candidate user and a money transfer request for requesting the payment target candidate user to transfer money to the user who performs the user operation. The payment target candidate user includes a user who is a money transfer destination to whom money is transferred in money transfer processing and a user who is a request destination to whom a money transfer request is transmitted.

According to the embodiment, the payment amount can be determined on the basis of the operation intensity of the user operation, and therefore, there is an advantage in that the user is saved from performing complicated procedure for money transfer processing such as inputting a payment amount with keys, and money can be transferred more intuitively and easily in the money transfer processing using the terminal 120.

<Functional Configuration of Embodiment>

Figure 3:
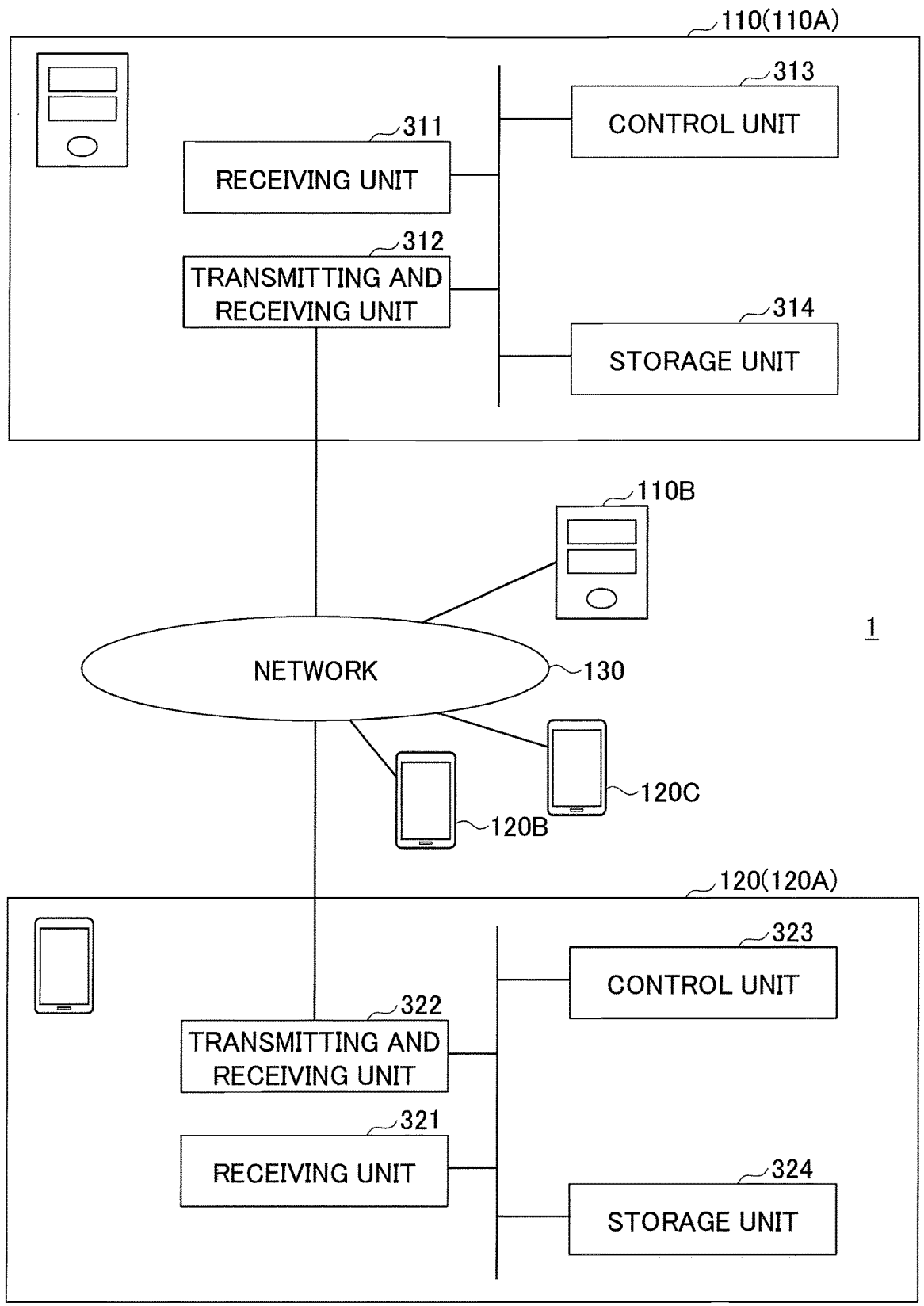
FIG. 3 is a drawing illustrating an example of a block diagram illustrating a functional configuration of a server and a terminal according to an embodiment.

A functional configuration of the server 110 and the terminal 120 will be explained with reference to FIG. 3. FIG. 3 is a drawing illustrating an example of a block diagram illustrating a functional configuration of the server 110 and the terminal 120 according to an embodiment. The functional units disclosed in FIG. 3 are implemented by performing operations in cooperation with the processor 201, the memory 202, the storage 203, the input-and-output interface 204, and the communication interface 205 provided in the information processing apparatus 200.

(1) Functional Configuration of Server

The server 110 includes a receiving unit 311, a transmitting and receiving unit 312, a control unit 313, and a storage unit 314. The function or processing performed by each functional unit may be implemented by machine learning or AI (Artificial Intelligence) to the extent that the function or processing can be implemented.

The receiving unit 311 receives various setting operations from a company that operates various services provided by the server 110.

The transmitting and receiving unit 312 transmits and receives data to and from the terminal 120 according to an instruction of the control unit 313. For example, when a user of the terminal 120 and the like is authenticated with a user ID and a password included in a login request from the terminal 120 and the like, the transmitting and receiving unit 312 establishes a communication session using HTTPS and the like with the terminal 120 and the like. In association with an ID of the established communication session, the address for communication of the terminal and the like, the user ID, and the like are stored. By using the established communication session, data is transmitted to the terminal 120 and the like.

The control unit 313 performs processing for providing a predetermined service such as a payment service, an electronic coupon distribution service, a financial service, an electronic commerce service, and the like to the user of the terminal 120. The control unit 313 causes the transmitting and receiving unit 312 to transmit information for controlling the display screen of the terminal 120.

The storage unit 314 stores information about the user of the terminal 120 and various kinds of information such as payment history and attributes of each user.

(2) Functional Configuration of Terminal

The terminal 120 includes a receiving unit 321, a transmitting and receiving unit 322, a control unit 323, and a storage unit 324. The function or processing performed by each functional unit may be implemented by machine learning or AI (Artificial Intelligence) to the extent that the function or processing can be implemented.

The receiving unit 321 receives various kinds of operations and the like from the user of the terminal 120.

The transmitting and receiving unit 322 transmits and receives data to and from the server 110 according to an instruction of the control unit 323. For example, the transmitting and receiving unit 322 establishes a communication session using HTTPS or the like with the server 110 when the terminal 120 logs in to the server 110. The communication address and the like of the server 110 are stored in association with the ID of the established communication session. Data is transmitted to the server 110 using the established communication session.

The control unit 323 performs processing using a predetermined service such as a payment service, financial service, an electronic commerce service, and the like provided by the server 110. The control unit 323 controls the display screen of the terminal 120 on the basis of the information and the like received from the server 110.

The storage unit 324 stores information for using various kinds of services such as a payment service provided by the server 110.

<Processing According to Embodiment>

Figure 4:
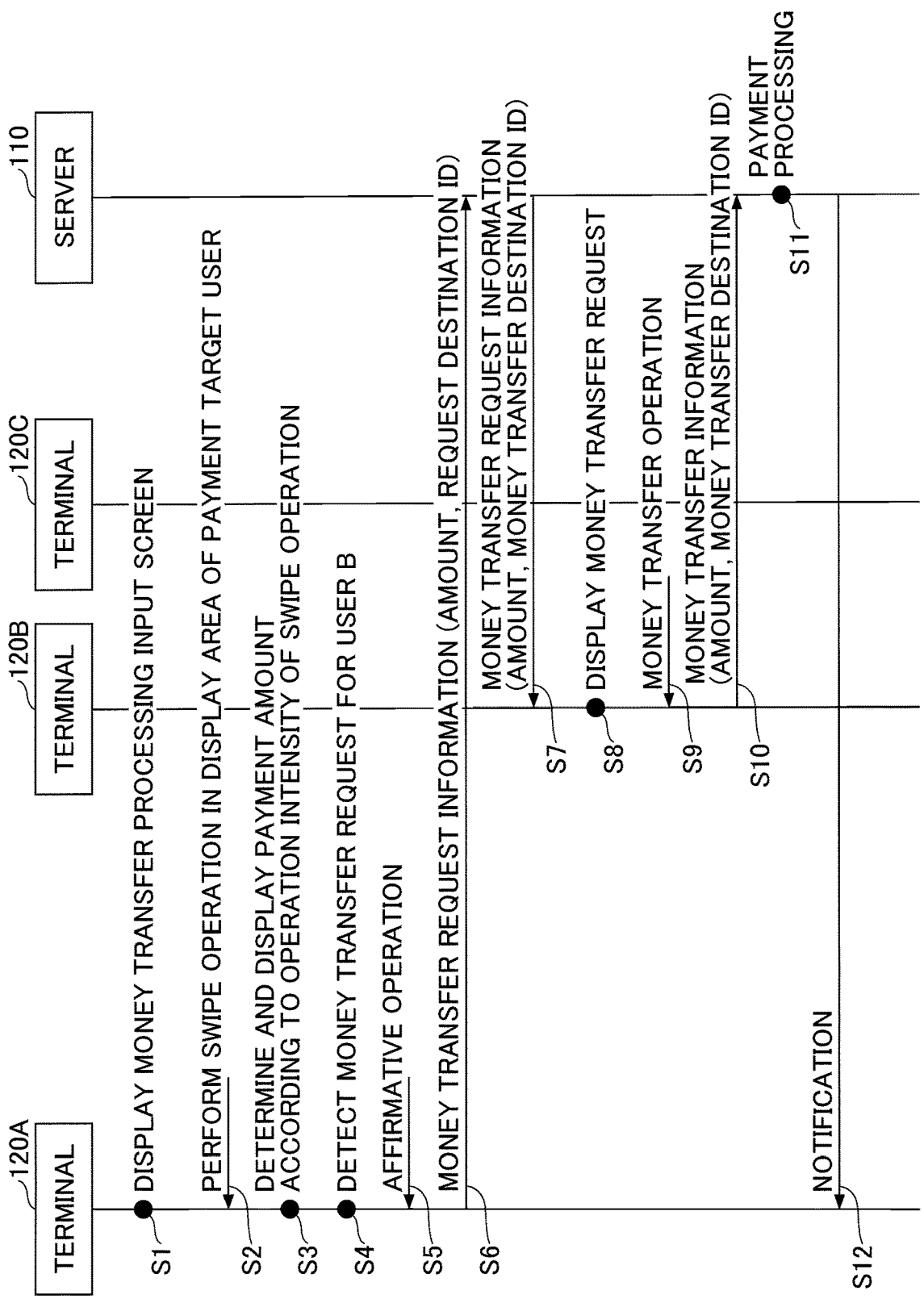
FIG. 4 is a drawing illustrating an example of a sequence of money transfer request processing performed by a communication system according to an embodiment.

Processing performed by the communication system 1 according to an embodiment will be described with reference to FIG. 4 to FIG. 6. FIG. 4 is a drawing illustrating an example of a sequence of money transfer request processing performed by the communication system 1 according to the embodiment. Note that it is assumed that the terminal 120 has been authenticated by the server 110 using an account of a user when the terminal 120 communicates with the server 110. Hereinafter, an example will be described in which a money transfer request is sent to a user B of a terminal 120B in accordance with a swipe operation performed by a user A of a terminal 120A.

In step S1, for example, in accordance with an instruction and the like given by the user A, the control unit 323 of the terminal 120A displays an input screen 121 of money transfer processing on the display screen of the terminal 120A.

Figure 5:
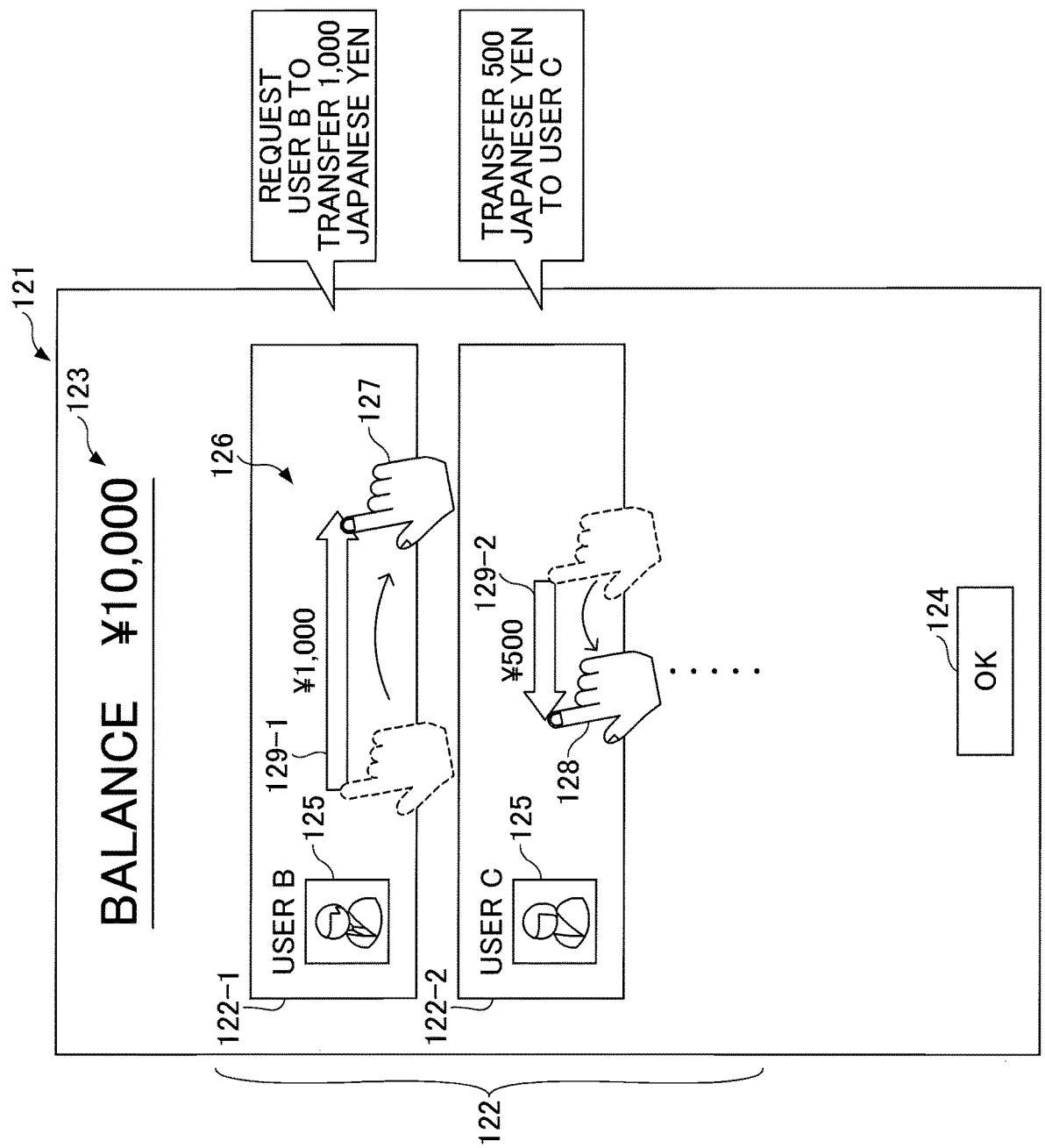
FIG. 5 is a drawing illustrating an example of an input screen of money transfer processing.

FIG. 5 is a drawing illustrating an example of the input screen 121 of the money transfer processing. As illustrated in FIG. 5, a friend list 122, a balance 123 of the account of the user A, and an OK button 124 for affirmation are displayed on the input screen 121.

The friend list 122 is a list of information about a plurality of money transfer candidate users. In the example of FIG. 5, information about money transfer candidate users is enumerated in a screen height direction. Examples of methods for choosing money transfer candidate users displayed on the friend list 122 include a method for sorting and displaying users on a social graph of the user A of the terminal 120A, a method of displaying users present in proximity to the user A by using position information about terminals and by using NFC and BLE, and a method for displaying a list stored in the storage unit 324 of the terminal 120A and the like.

In the example of FIG. 5, the friend list 122 is divided into operation areas in horizontally long rectangular shapes corresponding to respective payment target candidate users. In FIG. 5, for the sake of explanation, only an operation area 122-1 corresponding to the user B of the terminal 120B and an operation area 122-2 corresponding to another user C are displayed. In each of the operation areas 122-1, 122-2, an icon 125 of a user is displayed at an end portion at the left side of the screen, and a portion at the right side of the screen with respect to the icon 125 is an operation input area 126 for inputting a swipe operation.

In step S2, the receiving unit 321 of the terminal 120A receives a swipe operation performed by the user A in an operation area of a payment target user in the friend list 122. In the example of FIG. 5, a swipe operation 127 in a screen-right direction (i.e., a user operation in a second direction) is input in the operation area 122-1 of the user B.

In step S3, the control unit 323 of the terminal 120A determines a payment amount according to the operation intensity of the swipe operation, and displays the determined payment amount in the operation area of the payment target user. For example, the operation intensity of the swipe operation is an operation distance. In the example of FIG. 5, the operation distance of the swipe operation 127 performed in the operation area 122-1 of the user B is relatively longer than that of the swipe operation 128 performed in the operation area 122-2 of the user C. As a result, according to the operation distance, a relatively longer arrow 129-1 and a relatively higher amount, i.e., 1000 Japanese Yen, are displayed.

In step S4, the control unit 323 of the terminal 120A determines the type of payment on the basis of the operation direction of the swipe operation. In the present embodiment, the swipe operation 127 in the screen-right direction, i.e., an operation in a direction away from the icon 125 of the operation area 122-1, means a money transfer request requesting money transfer from a user in this area (i.e., the user B in FIG. 5) to the user A. In contrast, the swipe operation 128 in the screen-left direction, i.e., an operation in a direction toward the icon 125 of the operation area 122-2, means a money transfer from the user A to the user in this area (i.e., the user C in FIG. 5). Here, the control unit 323 detects a money transfer request to the user B.

In step S5, the receiving unit 321 of the terminal 120A receives an affirmation operation performed by the user A with respect to the payment amount displayed on the input screen 121. In the example of FIG. 5, when an OK button 124 is tapped, the receiving unit 321 of the terminal 120A receives an affirmation operation performed by the user A.

In step S6, the control unit 323 of the terminal 120A transmits, via the transmitting and receiving unit 322 to the server 110, money transfer request information about the money transfer request determined in step S3. For example, the money transfer request information includes the payment amount determined in step S3 and the user ID of the recipient of the money transfer request. In the example of FIG. 5, the recipient of the money transfer request is the user B.

In step S7, the control unit 313 of the server 110 transmits, via the transmitting and receiving unit 312, the money transfer request information to the user B of the terminal 120B designated as the user of the payment target. The money transfer request information includes information such as a money transfer amount, a user ID of a money transfer destination, and the like.

In step S8, the control unit 323 of the terminal 120B displays a screen of a money transfer request on a display screen of the terminal 120B on the basis of the money transfer request information received from the server 110.

In step S9, the receiving unit 321 of the terminal 120B receives a money transfer operation of the user B.

In step S10, the control unit 323 of the terminal 120B transmits, to the server 110, money transfer information based on the money transfer operation performed by the user B. The money transfer information includes information such as a money transfer amount, a user ID of a money transfer destination, and the like. Here, the money transfer information indicates that 1000 Japanese Yen is to be paid to the user A.

In step S11, the control unit 313 of the server 110 executes payment processing performed between a transmission-side user and a reception-side user of the money transfer request. More specifically, on the basis of the money transfer information received from the terminal 120B in step S10, a designated amount is transferred from the user B to the user A. In other words, on the basis of the money transfer information received from the terminal 120B in step S10, a value of the designated amount is subtracted from the user B, and is added to the user A.

In step S12, the control unit 313 of the server 110 transmits, via the transmitting and receiving unit 312 to the terminal 120A of the transmission source of the money transfer request, a notification indicating that a requested amount has been received from the user B in response to the money transfer request.

Figure 6:
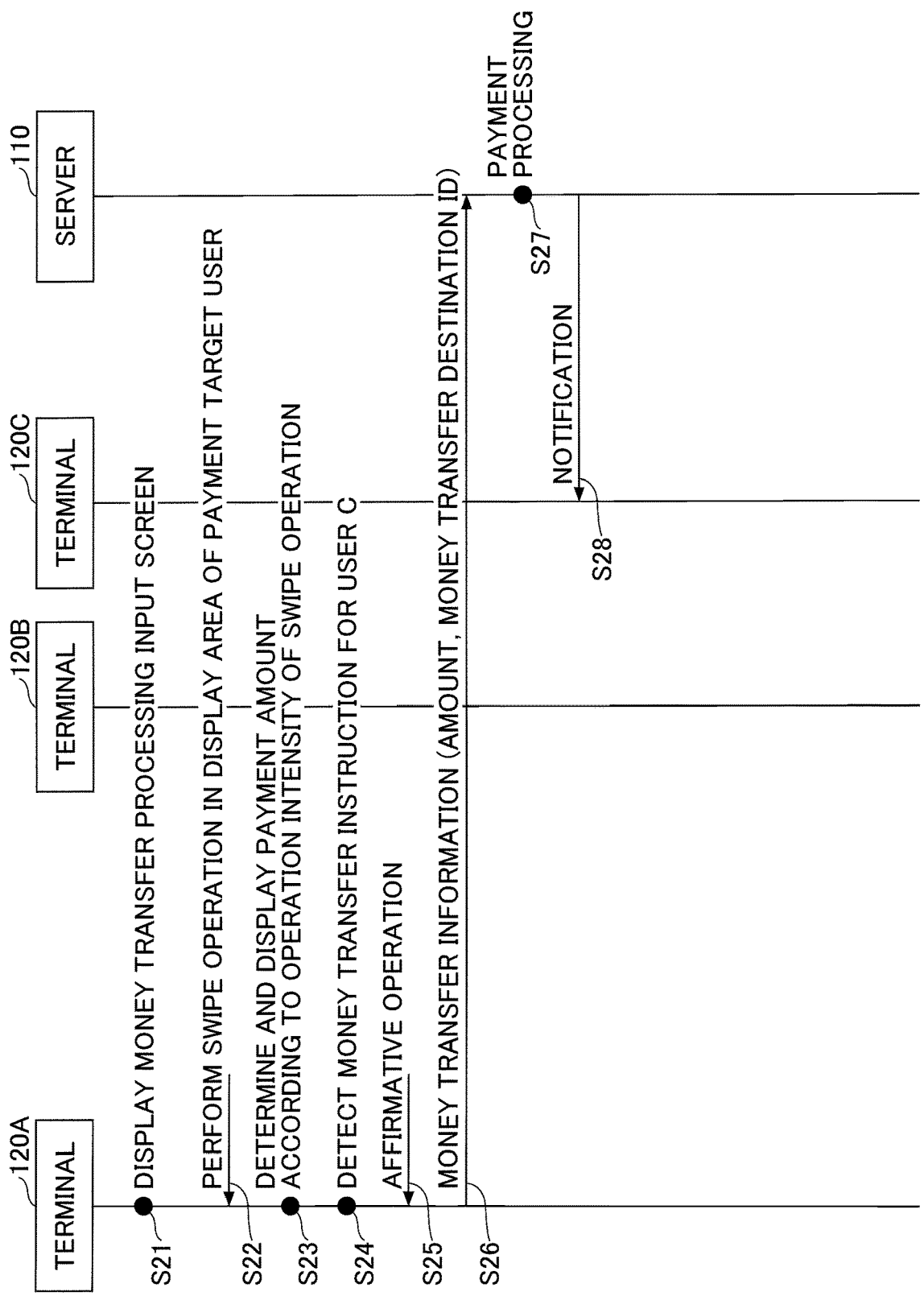
FIG. 6 is a drawing illustrating an example of a sequence of money transfer processing performed by a communication system according to an embodiment.

FIG. 6 is a drawing illustrating an example of a sequence of money transfer processing performed by the communication system 1 according to an embodiment. Here, a case where money is transferred to the user C of the terminal 120C in accordance with a swipe operation performed on the terminal 120A of the user A will be described as an example.

In step S21, for example, in accordance with an instruction and the like given by the user A, the control unit 323 of the terminal 120A displays, on the display screen of the terminal 120A, the input screen 121 of the money transfer processing as illustrated in FIG. 5.

In step S22, the receiving unit 321 of the terminal 120A receives a swipe operation performed by the user A in an operation area of a payment target user in the friend list 122. In the example of FIG. 5, a swipe operation 128 in a screen-left direction (i.e., a user operation in a first direction) is input in the operation area 122-2 of the user C.

In step S23, the control unit 323 of the terminal 120A determines a payment amount according to the operation intensity of the swipe operation (operation distance), and displays the determined payment amount in the operation area of the payment target user. In the example of FIG. 5, the operation distance of the swipe operation 128 performed in the operation area 122-2 of the user C is relatively shorter than that of the swipe operation 127 performed in the operation area 122-1 of the user B. As a result, according to the operation distance, a relatively shorter arrow 129-2 and a relatively lower amount, i.e., 500 Japanese Yen, are displayed.

In step S24, the control unit 323 of the terminal 120A determines the type of payment on the basis of the operation direction of the swipe operation. Here, the control unit 323 detects a money transfer instruction to the user C.

In step S25, the receiving unit 321 of the terminal 120A receives an affirmation operation performed by the user A with respect to the payment amount displayed on the input screen 121.

In step S26, the control unit 323 of the terminal 120A transmits, via the transmitting and receiving unit 322 to the server 110, money transfer information about the money transfer instruction determined in step S23. For example, the money transfer information includes information about the payment amount determined in step S23, the user ID of the money transfer destination, and the like. In the example of FIG. 5, the money transfer destination user is the user C.

In step S27, the control unit 313 of the server 110 executes payment processing between a transmission-side user and a reception-side user of the money transfer instruction. More specifically, on the basis of the money transfer information received from the terminal 120A in step S26, the designated amount is transferred from the user A to the user C.

In step S28, the control unit 313 of the server 110 transmits, via the transmitting and receiving unit 312 to the terminal 120C of the money transfer destination, a notification indicating that money has been received in response to the money transfer instruction from the user A.

In the present embodiment, step S1 of FIG. 4 and step S21 of FIG. 6 are examples of "processing for configuring an operation area 122-1, 122-2 associated with a payment target candidate user". Step S3 of FIG. 4 and step S23 of FIG. 6 are examples of "processing for determining a payment amount, based on an operation intensity of a user operation in the operation area 122-1, 122-2". Step S6 of FIG. 4 and step S26 of FIG. 6 are examples of "processing for transmitting information about a payment of the payment amount with respect to the payment target candidate user".

In the present embodiment, in a case where the user operation is the swipe operation 128 in the screen-left direction (i.e., a swipe operation toward an icon (object) associated with a payment target candidate user), a money transfer instruction of the payment amount to the payment target candidate user is transmitted. In a case where the user operation is the swipe operation 127 in the screen-right direction (i.e., a swipe operation away from an icon (object) associated with a payment target candidate user), a money transfer request of a payment amount to the payment target candidate user is transmitted. Therefore, according to a difference in the direction of the swipe operation, an instruction of a money transfer and an instruction of a money transfer request can be designated and used intuitively, and an instruction input can be entered easily.

In the present embodiment, the operation distance of the swipe operation (movement distance) has been shown as an example of an operation intensity of a user operation, which is an index for determining the money transfer amount, but the operation intensity of the user operation is not limited thereto. The operation intensity of the user operation may be anything as long as it can detect a relative difference in the operation amount, and for example, the operation intensity of the user operation may be based on other information such as a number of times a contact is made, a length of time a contact is made, a pressure of press-down, a length of time a press-down is performed. Additionally, in the present embodiment, a configuration for displaying a change of a payment amount by changing a length of an arrow in accordance with the operation intensity of the user operation has been shown as an example, but the arrow may not be displayed. A payment amount may be presented to the user in a relative manner, and, for example, in accordance with a length of time a press-down is performed and a pressure of press-down, the icon 125 of the target user may be enlarged to express a payment amount according to the size of area of the icon 125.

In the money transfer request processing illustrated in FIG. 4 and the money transfer processing illustrated in FIG. 6, a plurality of money transfers may be performed collectively at a time. For example, on the input screen 121 of FIG. 5, swipe operations for money transfer requests or money transfers to a plurality of users may be input, and thereafter the OK button 124 may be pressed down, so that information about the plurality of money transfers may be collectively transmitted to the server 110. An amount determined by an operation for a single user may be reflected in money transfers for other users.

Hereinafter, an example of processing according to examples will be described. Processing according to the following examples can be executed in combination with processing in other embodiments.

First Example

The first example is an example for displaying a button screen 140 for a small-amount determination (payment amount adjustment button) when a swipe operation stops during amount determination with a swipe operation. According to the first example, a small-amount fine-adjustment can be easily performed.

«Processing of First Example»

Figure 7:
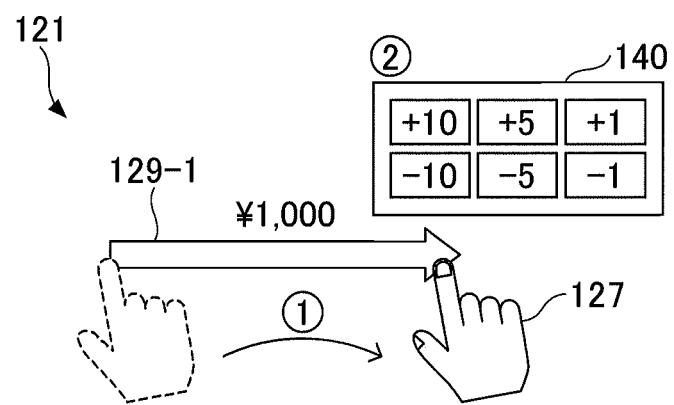
FIG. 7 is a drawing illustrating an example of a button screen according to a first example.

FIG. 7 is a drawing illustrating an example of a button screen 140 according to the first example. In FIG. 7, when a user performs a swipe operation 127 for an operation distance corresponding to about 1000 Japanese Yen and holds the finger in contact with the input screen 121, a stop of the user operation is detected, and as a result, a button screen 140 for small-amount input is displayed in a pop up manner. In the example of FIG. 7, six buttons including +10 Japanese Yen, +5 Japanese Yen, +1 Japanese Yen, −10 Japanese Yen, −5 Japanese Yen, and −1 Japanese Yen are displayed. When a button of the button screen 140 is tapped by the user, the amount can be adjusted in units of 10 Japanese Yen, in units of 5 Japanese Yen, or in units of 1 Japanese Yen.

Second Example

The second example is an example of capability of making a small-amount adjustment when a user stops a swipe operation and performs a swipe operation in another direction during amount determination with a swipe operation. According to the second example, a small-amount fine-adjustment can be easily performed.

«Processing of Second Example»

Figure 8:
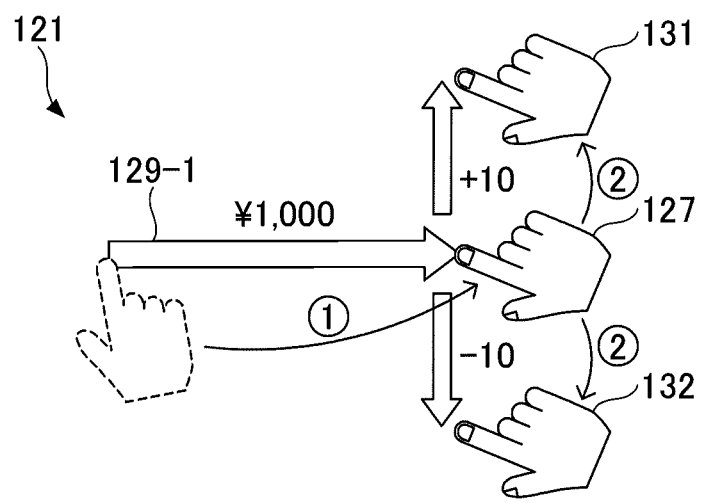
FIG. 8 is a drawing illustrating an example of small-amount adjustment operation according to a second example.

FIG. 8 is a drawing illustrating an example of a small-amount adjustment operation according to the second example. In FIG. 8, a user performs a swipe operation 127 for an operation distance corresponding to 1000 Japanese Yen to move the finger in a screen-right direction and stops the swipe operation 127 where shown, and thereafter, the user can adjust the amount by a small amount by performing a swipe operation in a screen height direction, which is another direction different from the direction in which the swipe operation 127 is performed. The small amount is an amount that is small with respect to the amount corresponding to the swipe operation in the screen-right direction. In example of FIG. 8, 10 Japanese Yen can be added to the payment amount by a swipe operation 131 in a screen-upward direction, and 10 Japanese Yen can be subtracted by a swipe operation 132 in a screen-downward direction, and a small amount can be added to or subtracted from the payment amount by performing an operation in a height direction.

Third Example

Third example is an example for adjusting a unit amount by which the payment amount is increased or decreased in accordance with an operation speed of the swipe operation. According to the third example, the range (i.e., the unit) of adjusting the payment amount can be changed in accordance with the operation speed, and a setting operation of the payment amount can be easily performed.

«Processing of Third Example»

In the third example, for example, in a case where an operation speed is equal to or more than a predetermined speed in the swipe operation 127 in the screen-right direction illustrated in FIGS. 7, 8, and the like, the unit amount by which the payment amount is increased or decreased is increased, e.g., a payment amount increases in units of 100 Japanese Yen, in accordance with the operation distance. In contrast, in a case where the operation speed is equal to or less than the predetermined speed, the unit amount by which the payment amount is increased or decreased is decreased, e.g., a payment amount increases in units of 10 Japanese Yen even with the same operation distance.

Fourth Example

The fourth example is an example for changing a payment amount in accordance with a direction in which a swipe operation is performed. According to the fourth example, the payment amount can be determined in accordance with the operation direction. Therefore, users are not required to perform fine-adjustment, and the payment amount can be changed easily by just changing the direction.

«Processing of Fourth Example»

Figure 9:
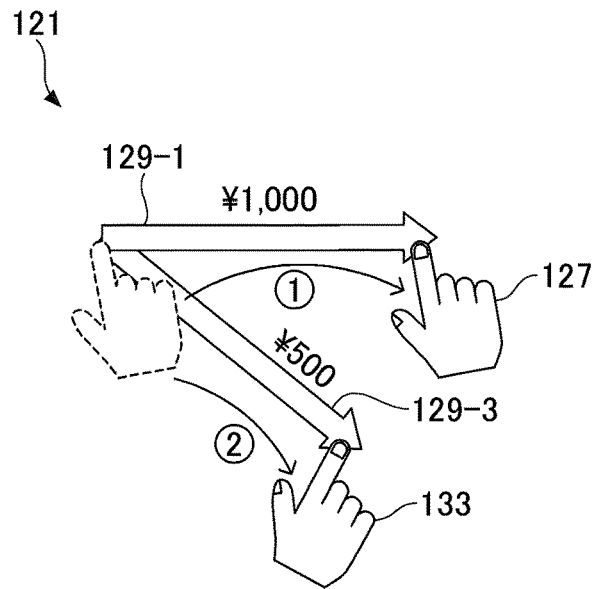
FIG. 9 is a drawing illustrating an example of payment amount setting operation according to a fourth example.

FIG. 9 is a drawing illustrating an example of a payment amount setting operation according to the fourth example. In FIG. 9, an arrow 129-1 in a right direction is displayed by a swipe operation 127 in a right direction, and a payment amount of 1000 Japanese Yen associated with this arrow 129-1 is displayed. Also, an arrow 129-3 in a lower right direction is displayed by a swipe operation 133 in a lower right direction, and a payment amount 500 Japanese Yen associated with this arrow 129-3 is displayed.

Fifth Example

The fifth example is an example for changing a payment amount in accordance with the number of times a swipe operation is performed. According to the fifth example, the payment amount can be determined in accordance with the number of times a swipe operation is performed. Therefore, users are not required to perform fine-adjustment, and the payment amount can be changed easily by just changing the number of times the swipe operation is performed.

«Processing of Fifth Example»

Figure 10:
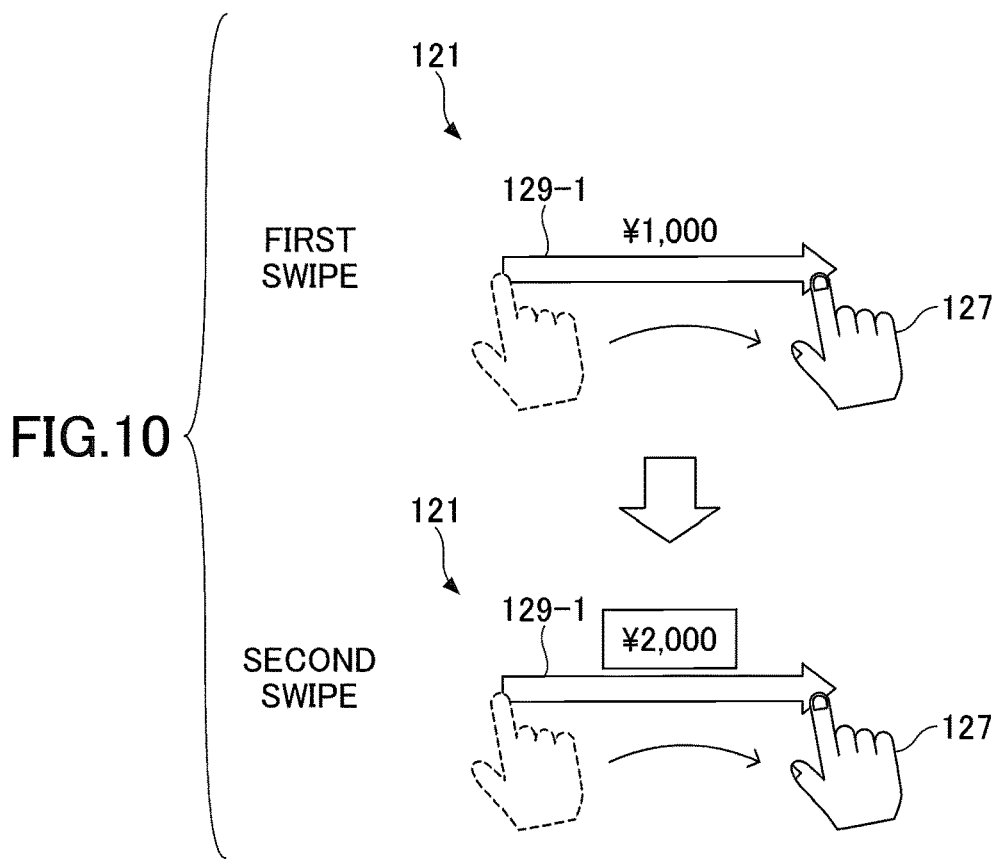
FIG. 10 is a drawing illustrating an example of payment amount setting operation according to a fifth example.

FIG. 10 is a drawing illustrating an example of a payment amount setting operation according to the fifth example. In FIG. 10, with the first swipe operation 127 in the right direction, an arrow 129-1 in a right direction is displayed, and a payment amount of 1000 Japanese Yen associated with this arrow 129-1 is displayed. Subsequently, with the second swipe operation 127 in the right direction, the payment amount is doubled, and 2000 Japanese Yen is displayed.

Alternatively, in a manner similar to the example of FIG. 5 and the like, a payment amount may be changed also in accordance with the operation distance of the swipe operation, and the amount may be accumulated in accordance with the number of times a swipe operation is performed.

Sixth Example

The sixth example is an example for changing an increment or decrement amount per predetermined distance of swipe operation in accordance with a balance of the recipient of the money transfer request. According to the sixth example, the amount that can be paid by the recipient of the money transfer request can be easily specified.

«Processing of Sixth Example»

Figure 11B:
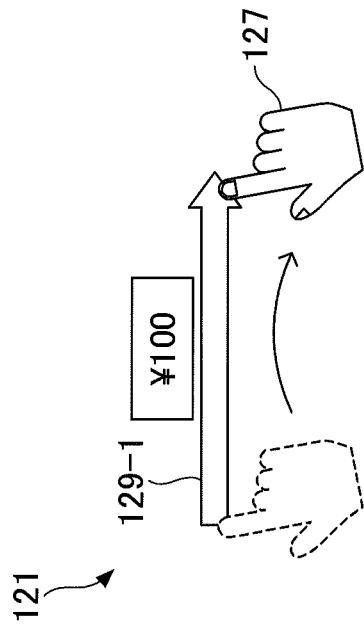
FIGS. 11A and 11B are drawings illustrating an example of payment amount setting operation according to a sixth example.
Figure 11A:
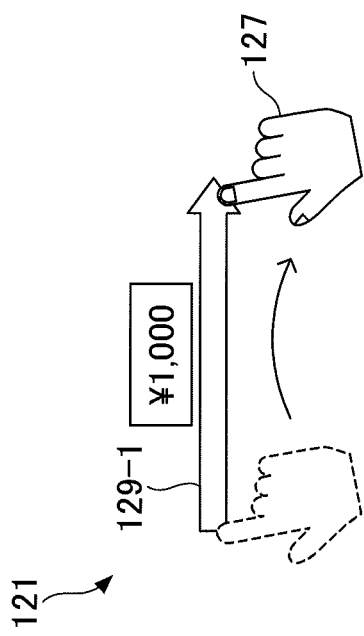

FIGS. 11A and 11B are drawings illustrating an example of payment amount setting operation according to the sixth example. As illustrated in FIG. 11A, in a case where the balance of the account of the user B to whom a money transfer request is transmitted is relatively high, a unit amount by which the payment amount is increased or decreased for a certain operation distance is increased relatively. In contrast, as illustrated in FIG. 11B, in a case where the balance of the account of the user B to whom a money transfer request is transmitted is relatively low, a unit amount by which the payment amount is increased or decreased for a certain operation distance is decreased relatively.

Seventh Example

The seventh example is an example for changing an increment or decrement amount per predetermined distance of swipe operation in accordance with a balance of the user who uses the terminal 120A. According to the seventh example, the amount that can be paid by the user who performs a money transfer can be easily specified.

«Processing of Seventh Example»

Figure 12A:
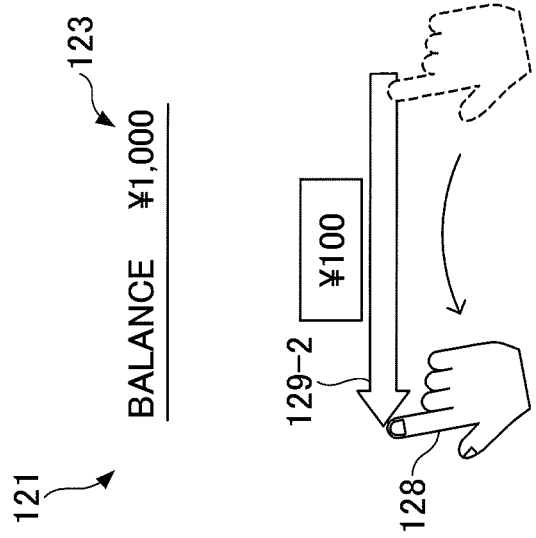
FIGS. 12A and 12B are drawings illustrating an example of payment amount setting operation according to a seventh example.
Figure 12B:
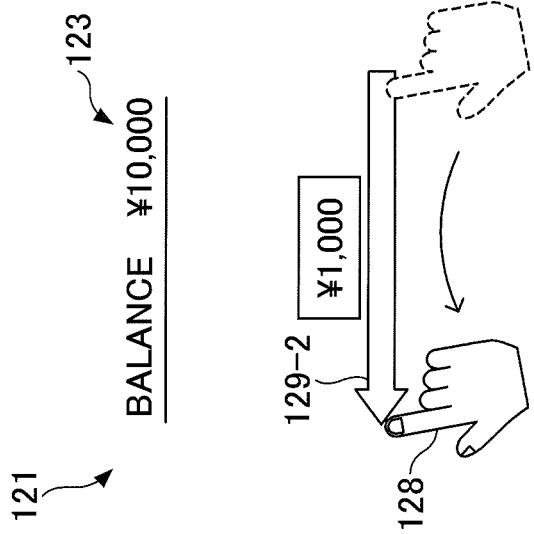

FIGS. 12A and 12B are drawings illustrating an example of a payment amount setting operation according to the seventh example. As illustrated in FIG. 12A, in a case where a balance 123 of an account of the user A who performs a money transfer is relatively high, a unit amount by which the payment amount is increased or decreased for a certain operation distance is increased relatively. In contrast, as illustrated in FIG. 12B, in a case where the balance 123 of the account of the user A who performs the money transfer is relatively low, a unit amount by which the payment amount is increased or decreased for a certain operation distance is decreased relatively.

Eighth Example

The eighth example is an example in which a friend list 134 of an input screen 121A of money transfer processing is not displayed as a list, and is displayed in an object display in which icons of respective users are arranged on a two-dimensional plane, and a payment amount is changed in accordance with a swipe operation between icons. According to the eighth example, an amount to be transferred to a money transfer destination and an amount requested to be transferred from a money transfer request destination can be set in an intuitive manner.

«Processing of Eighth Example»

Figure 13:
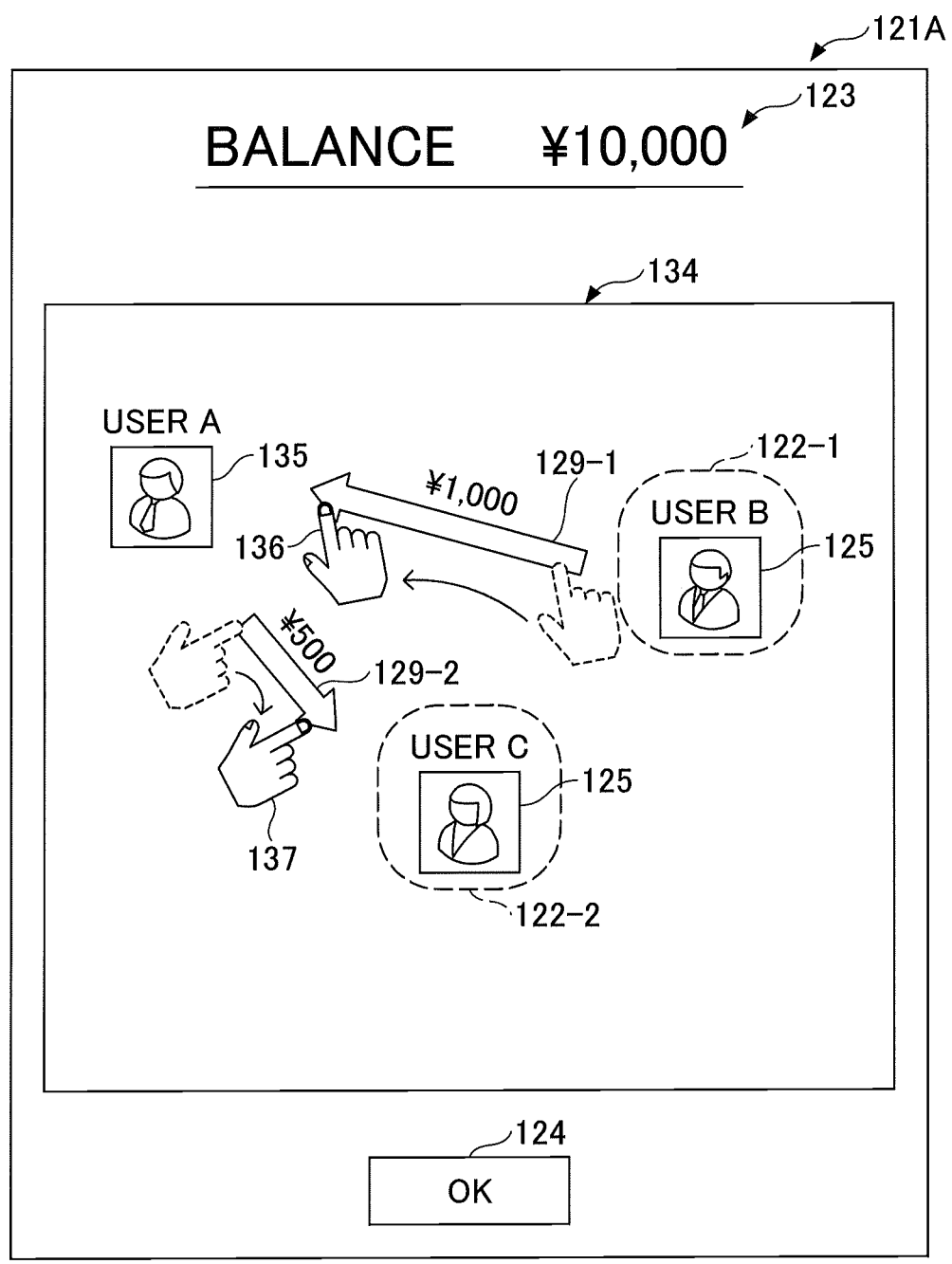
FIG. 13 is a drawing illustrating an example of payment amount setting operation according to an eighth example.

FIG. 13 is a drawing illustrating an example of a payment amount setting operation according to an eighth example. As illustrated in FIG. 13, in the input screen 121A, the friend list 134 in the object display format is displayed, and in this example, an icon 135 of a user A and icons 125 of a user B and a user C are arranged in a dispersed manner on the screen. In the object display, the icons 125 of the users B and C serve as operation areas 122-1, 122-2 of the users B and C, respectively.

In a case where the user A transmits a money transfer request to the user B, the user A performs a swipe operation 136 in a direction away from the icon 125 of the user B, who is requested to transfer money, toward the icon 135 of the user A, and a payment amount and an arrow 129-1 having a length according to the operation distance of this swipe operation 136 are displayed. In contrast, in a case where the user A transfers money to the user C, the user A performs a swipe operation 137 in a direction away from the icon 135 of the user A toward the icon 125 of the user C who receives money transfer, and a payment amount and an arrow 129-2 having a length according to the operation distance of this swipe operation 137 are displayed.

More specifically, in the eighth example, the direction (first direction) of the swipe operation 137 for proceeding with a money transfer of a payment amount to a payment target candidate user is a direction toward the operation area 122-2 of the user C, who is the payment target candidate user. In a similar manner, the direction (second direction) of the swipe operation 136 for proceeding with a money transfer request of a payment amount for a payment target candidate user is a direction away from the operation area 122-1 of the user B, who is the payment target candidate user.

What is claimed is:

1. A non-transitory computer-readable recording medium recorded with an information processing program executable by a processor of an information processing apparatus, the information processing apparatus being used by a first user and including the processor and a display unit having a display surface, the information processing program causing the processor to perform operations comprising:
    configuring an operation area on the display surface of the display unit, the operation area being associated with a second user;
    detecting an extent of an action in a user operation performed with a manipulator or a finger of the first user brought into contact with the display surface of the display unit and moved with respect to the operation area, and determining a payment amount that is to be paid, based on the detected extent of the action; and
    transmitting information about a payment of the payment amount with respect to the second user,
    wherein the payment amount is determined according to the extent of the action and a first balance that is an amount of value held in an account of the first user,
    the extent of the action is a distance by which the manipulator or the finger of the first user moves on the display surface, and
    the determining of the payment amount further comprises increasing the payment amount by a predetermined increment amount per a predetermined unit distance of the distance by which the manipulator or the finger of the first user moves on the display surface, the predetermined increment amount being increased when the first balance is relatively greater, and the predetermined increment amount being decreased when the first balance is relatively smaller.

2. The non-transitory computer-readable recording medium according to claim 1, wherein the transmitting of the information about the payment further comprises, in a case where the first user performs the user operation by moving the manipulator or the finger of the first user in a first direction, transmitting, to a server, a money transfer instruction for transferring the payment amount to the second user to cause the server to make the payment in which the payment amount is paid from the first user to the second user.

3. The non-transitory computer-readable recording medium according to claim 2, wherein the first direction is a direction toward an object associated with the second user.

4. The non-transitory computer-readable recording medium according to claim 2, wherein the transmitting of the information about the payment further comprises, in a case where the first user performs the user operation by moving the manipulator or the finger of the first user in a second direction that is different from the first direction, transmitting a money transfer request for requesting the second user to transfer the payment amount from the second user to the first user.

5. The non-transitory computer-readable recording medium according to claim 4, wherein the second direction is a direction away from an object associated with the second user.

6. The non-transitory computer-readable recording medium according to claim 1, wherein the extent of the action includes a distance of movement in the user operation.

7. The non-transitory computer-readable recording medium according to claim 1, wherein the extent of the action includes a number of times a contact is made in the user operation.

8. The non-transitory computer-readable recording medium according to claim 1, wherein the extent of the action includes a pressure of press-down in the user operation.

9. The non-transitory computer-readable recording medium according to claim 1, wherein the more quickly the user operation is performed, the larger the predetermined increment amount by which the payment amount is increased or decreased becomes.

10. The non-transitory computer-readable recording medium according to claim 1, wherein the more slowly the user operation is performed, the smaller the predetermined increment amount by which the payment amount is increased or decreased becomes.

11. The non-transitory computer-readable recording medium according to claim 1, wherein a payment amount adjustment button is displayed after the first user performs the user operation and releases the manipulator or the finger of the first user away from the display surface of the display unit.

12. The non-transitory computer-readable recording medium according to claim 1, wherein, the first user performs the user operation, by moving the manipulator or the finger of the first user in a a first direction for money transfer, for transferring the payment amount from the first user to the second user, and
    wherein the detecting further comprises detecting, after the first user performs the user operation, an extent of a second action in a second user operation performed with the manipulator or the finger of the first user in contact with the display surface of the display unit and moved in a second direction that is different from the first direction,
    the extent of the action is a distance by which the manipulator or the finger of the first user moves on the display surface, and
    in the second user operation, the payment amount is increased or decreased by a predetermined increment-or-decrement amount per a predetermined second unit distance of the distance by which the manipulator or the finger of the first user moves on the display surface in the second user operation, the predetermined increment-or-decrement amount being smaller than the predetermined increment amount.

13. The non-transitory computer-readable recording medium according to claim 1, wherein the payment amount is determined according to the extent of the action and a second balance that is an amount of value held in an account of the second user.

14. The non-transitory computer-readable recording medium according to claim 13, wherein the determining of the payment amount further comprises increasing the payment amount by the predetermined increment amount per the predetermined unit distance, the predetermined increment amount being increased when the second balance is relatively greater, and the predetermined increment amount being decreased when the second balance is relatively smaller.

15. The non-transitory computer-readable recording medium according to claim 11, wherein the payment amount is determined based on the detected extent of the action in accordance with the predetermined increment amount, and
the payment amount adjustment button is displayed at or in proximity to a position at an end of the user operation performed by the first user,
wherein the detecting further comprises detecting, after the first user performs the user operation, a third user operation in which the first user brings the manipulator or the finger of the first user into contact with or into proximity to the payment amount adjustment button displayed on the display surface of the display unit, and
the payment amount is increased or decreased based on the third user operation in accordance with a third unit amount smaller than the first unit amount.

16. The non-transitory computer-readable recording medium according to claim 1, wherein the payment amount is determined based on the detected extent of the action in accordance with the predetermined increment amount, and,
the first unit amount is increased in accordance with an increase in the first balance.

17. An information processing method executed by an information processing apparatus, the information processing apparatus being used by a first user and including the processor and a display unit having a display surface, the information processing method comprising:
configuring an operation area on the display surface of the display unit, the operation area being associated with a second user;
detecting an extent of an action in a user operation performed with a manipulator or a finger of the first user brought into contact with the display surface of the display unit and moved with respect to the operation area, and determining a payment amount that is to be paid, based on the detected extent of the action; and
transmitting information about a payment of the payment amount with respect to the second user,
wherein the payment amount is determined according to the extent of the action and a first balance that is an amount of value held in an account of the first user,
the extent of the action is a distance by which the manipulator or the finger of the first user moves on the display surface, and
the determining of the payment amount further comprises increasing the payment amount by a predetermined increment amount per a predetermined unit distance of the distance by which the manipulator or the finger of the first user moves on the display surface, the predetermined increment amount being increased when the first balance is relatively greater, and the predetermined increment amount being decreased when the first balance is relatively smaller.

18. An information processing apparatus used by a first user, comprising:
a display unit having a display surface;
a memory; and
a processor coupled to the memory and configured to perform operations comprising:
configuring an operation area on the display surface of the display unit, the operation area being associated with a second user;
detecting an extent of an action in a user operation performed with a manipulator or a finger of the first user brought into contact with the display surface of the display unit and moved with respect to the operation area, and determining a payment amount that is to be paid, based on the detected extent of the action; and
transmitting information about a payment of the payment amount with respect to the second user,
wherein the payment amount is determined according to the extent of the action and a first balance that is an amount of value held in an account of the first user,
the extent of the action is a distance by which the manipulator or the finger of the first user moves on the display surface, and
the determining of the payment amount further comprises increasing the payment amount by a predetermined increment amount per a predetermined unit distance of the distance by which the manipulator or the finger of the first user moves on the display surface, the predetermined increment amount being increased when the first balance is relatively greater, and the predetermined increment amount being decreased when the first balance is relatively smaller.

19. The non-transitory computer-readable recording medium according to claim 12, wherein the first user performs and the second user operation starting from a position where the first user finishes the user operation.

20. The non-transitory computer-readable recording medium according to claim 12, wherein the second direction and the third direction are substantially perpendicular to each other.

* * * * *